United States Patent [19]

Meissinger

[11] 3,752,996
[45] Aug. 14, 1973

[54] METHOD OF AND DEVICE FOR DETERMINING THE CHARACTERISTICS AND FLUX DISTRIBUTION OF MICROMETEORITES

[75] Inventor: Hans F. Meissinger, Los Angeles, Calif.

[73] Assignee: TRW Inc., Redondo Beach, Calif.

[22] Filed: Jan. 13, 1971

[21] Appl. No.: 106,106

[52] U.S. Cl. .................... 250/219 DF, 250/83 CD
[51] Int. Cl. ........................................... G01n 21/30
[58] Field of Search ............... 250/83 CD, 219 DF, 250/219 D, 219 FR; 324/54

[56] References Cited
UNITED STATES PATENTS
2,892,951  6/1959  Lindermann ................ 250/219 DF
2,947,876  8/1960  Larew ............................ 250/219 DF Primary Examiner—Archie R. Borchelt
Assistant Examiner—D. C. Nelms
Attorney—Neil B. Siegel, Paul F. McCaul, Leonard Rawicz, John R. Manning and G. T. McCoy

[57] ABSTRACT

A micrometeorite impact sensing method of and device for determining the characteristics and flux distribution of micrometeorites by first exposing to the micrometeorite environment a panel of sheet material of a thickness to be punctured by impacting micrometeorites of given impact energy and then scanning the panel with a scanner which produces an output representing the number and size of the puncture holes in the panel. The disclosed inventive embodiment employs a panel of varying thickness which is exposed to the micrometeoric environment by deployment from a stowage container. After exposure, the panel is scanned for puncture holes by illuminating one side of the panel and retracting the panel into its stowage container past a photoelectric scanner which receives light through the panel holes as the latter travels across a scanning slit in the scanner and produces an output representing the incident light.

10 Claims, 4 Drawing Figures

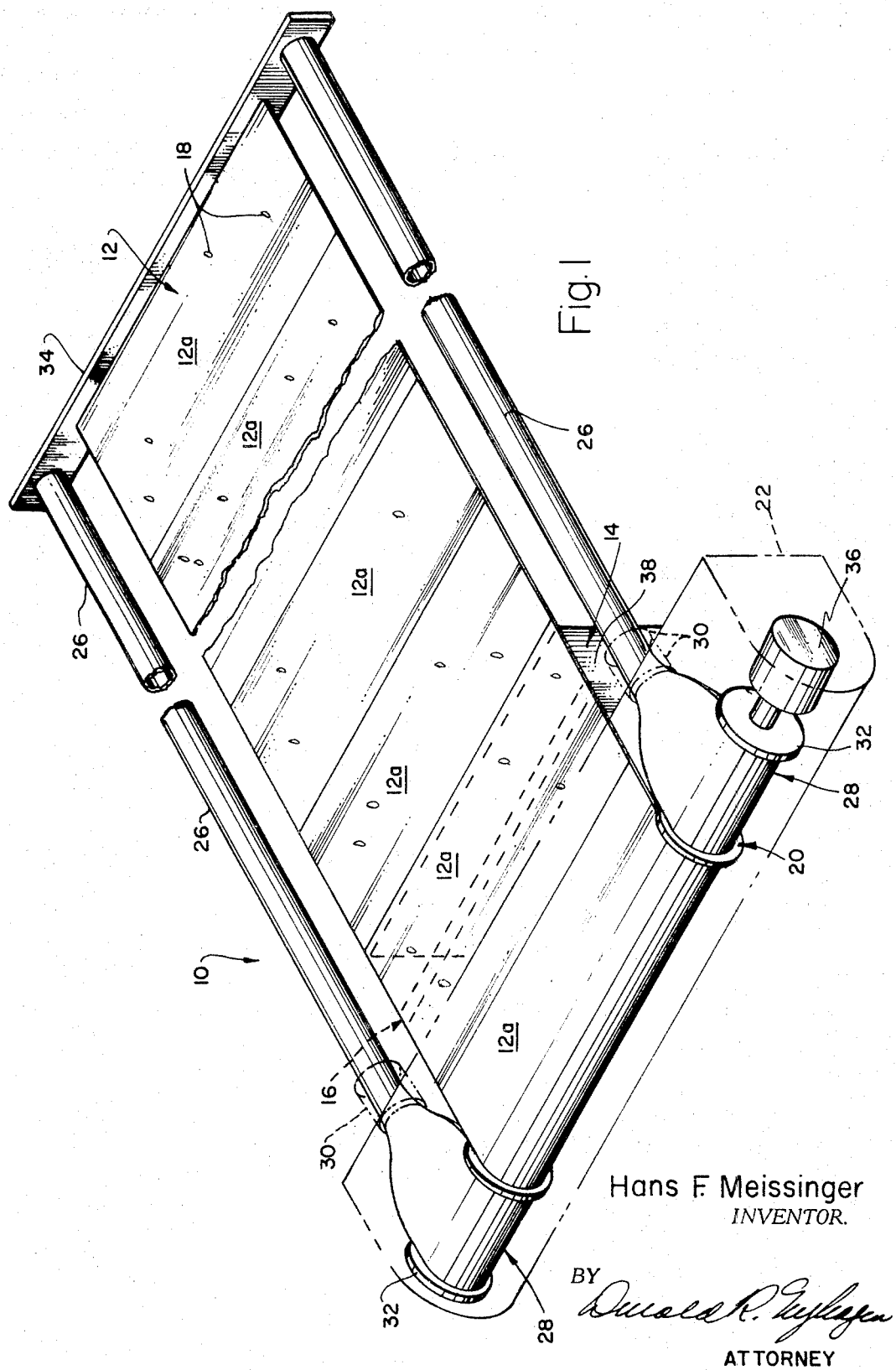

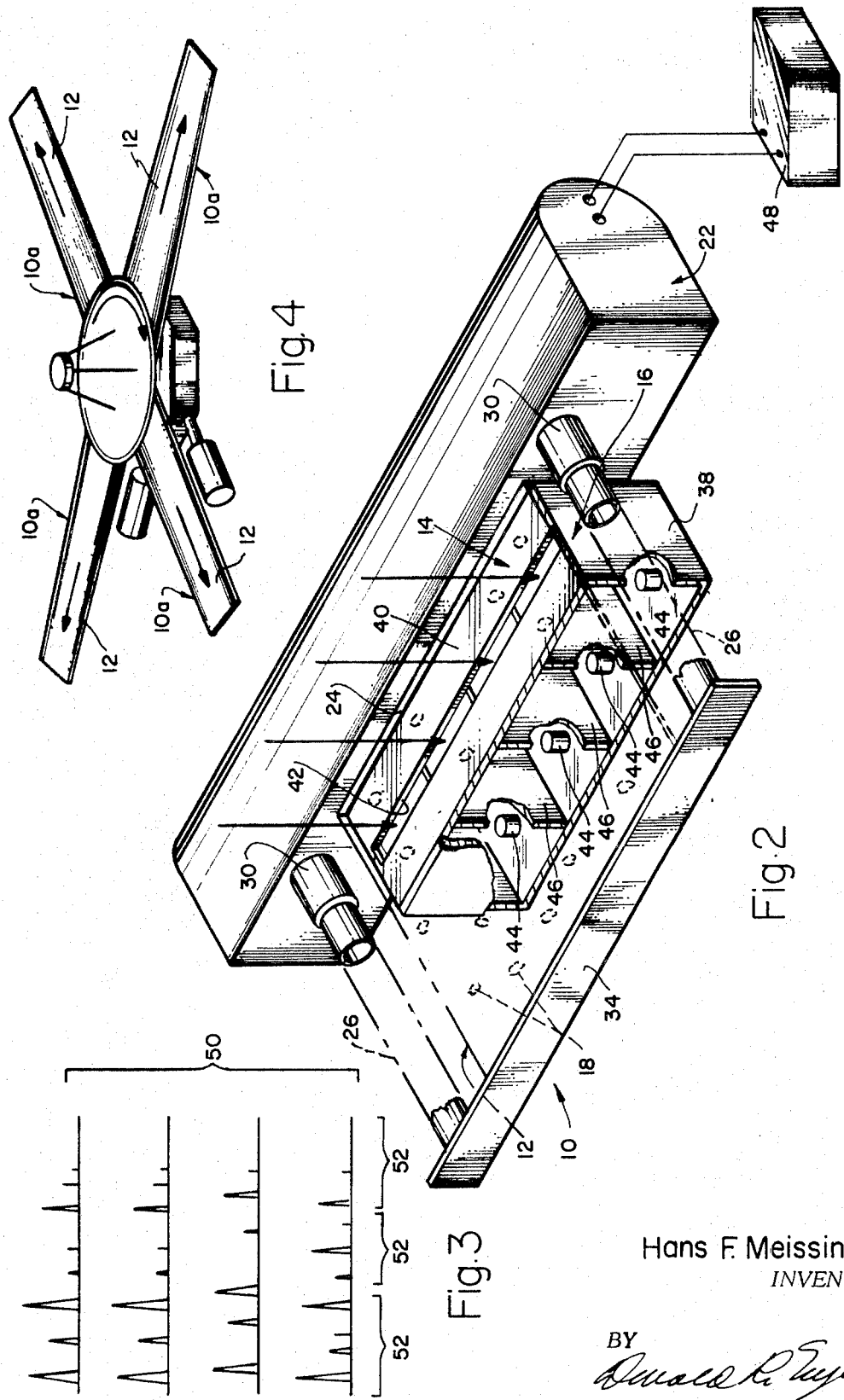

METHOD OF AND DEVICE FOR DETERMINING THE CHARACTERISTICS AND FLUX DISTRIBUTION OF MICROMETEORITES

ORIGIN OF INVENTION

The invention described herein was made in the performance of work under a NASA contract and it subject to the provisions of Section 305 of the National Aeronautics and Space Act of 1958, Public Law 85-568(72 Stat. 435, 42 U.S.C. 2457).

BACKGROUND OF THE INVENTION

1. Field of the Invention

This invention relates generally to the field of micrometeorite detection and more particularly to a micrometeorite impact sensing method and device for determining the characteristics and flux distribution of micrometeorites in a micrometeoric environment.

2. Prior Art

A variety of micrometeoric studies are involved in present space missions and contemplated for future space missions. By way of example, some of the present and contemplated studies are asteroid belt surveys in connection with interplanetary space probes; determination of the nature and flux of the particles which comprise the rings of Saturn: detection of micrometeoric showers in the space environment about the earth; and study of micrometeoric activity on the lunar surface.

In the past, micrometeoric studies have been conducted with two different types of micrometeorite impact sensors. One type of impact sensor is a capacitive sensor consisting of electrically charged metal sheets separated by a dielectric sheet to form a capacitive panel which registers a temporary electrical discharge when punctured by a micrometeorite. The other type of sensor is a pressurized cell device having a pressurized cell containing a pressure transducer. Puncture of the cell by a micrometeorite results in the loss of cell pressure which is detected by periodic interrogation of the cell transducers.

Neither of these types of micrometeorite impact sensors are satisfactory for present day and contemplated future micrometeorite studies. Thus, the capacitive devices have been found to be unreliable for the reason that they frequently produce spurious signals which are clearly not caused by micrometeorite penetration. The pressurized cell monitoring devices, on the other hand, require a number of instrumented cells, each with a transducer, resulting in a complex wiring system and an overall costly and weight consuming detection system. Moreover, each cell is capable of detecting only a single micrometeorite impact.

SUMMARY OF THE INVENTION

The present invention avoids the above noted and other deficiencies of the existing micrometeorite impact sensors. The impact sensor of the invention has a panel of sheet material, such as a strip of metal foil, which is sized in thickness to be punctured by impacting micrometeorites of given impact energy, and a scanner for scanning the panel and producing an output representing the number and size of the puncture holes in the panel. Preferably, the panel is composed of a number of sections of differing thickness requiring differing micrometeorite impact energies for penetration. In operation of the sensor, the panel is initially exposed for a period of time to a micrometeorite environment, such that micrometeorites impacting the panel with an impact energy equal to or greater than the energy required for penetration puncture of the panel. The panel is then scanned by the scanner to produce an output representing the number and size of the puncture holes in the panel and hence the energy, size, and flux distribution of the impacting micrometeorites.

In the disclosed inventive embodiment, the sensor impact panel is wound on a rotary storage drum within a stowage container in which the panel is contained for stowage and from which the panel is deployed for exposure to a meteoric environment. The container includes a photoelectric scanner having a scanning slit across which the panel moves during deployment and retraction and photoelectric detectors for receiving light entering through the slit. The side of the panel opposite the slit is illuminated by sunlight or artificial light. After exposure to a micrometeoric environment, the panel is retracted at a scanning speed past the scanning slit into the stowage container. As meteorite puncture holes in the panel travel across the slit, they transmit light to the photodetectors which then generate an output proportional to the incident light.

BRIEF DESCRIPTION OF THE DRAWINGS

In the drawings:

FIG. 1 is a perspective view of a present micrometeorite impact sensor with the sensor housing shown in phantom lines for clarity;

FIG. 2. is a perspective view of the sensor from another angle with parts broken away for clarity;

FIG. 3 is a diagram of the sensor output; and

FIG. 4 is a perspective view of a spin stabilized spacecraft equipped with a number of the present impact sensors.

DESCRIPTION OF THE PREFERRED EMBODIMENTS

Turning to the drawings, the illustrated micrometeorite impact sensor 10 has a panel 12 of sheet material, such as metal foil, to be exposed to a micrometeorite environment. The panel includes a number of sections 12a each having a thickness such that the section is punctured by micrometeorites which impact the section with given impact energy. The several sections differ in thickness and hence require different minimum meteorite impact energies for penetration. At one side of the panel is a scanner 14 for scanning the panel and producing an output representing the number and size of the puncture holes in the panel. This scanner has a narrow scanning zone 16 extending across the panel.

In operation of the impact sensor 10, the panel 12 is first exposed to a micrometeorite environment for a period of time. During this exposure, the panel is impacted by micrometeorites and is punctured by those which impact with at least the minimum impact energy required for penetration of the respective panel section 12a. After exposure, the panel 12 and scanner 14 are moved relative to one another in a manner such that the relative movement of the panel with respect to the scanner occurs through the scanning zone 16. The scanner senses passage through the scanning zone of the puncture holes 18 in the panel and produces an output representing the number and size of the holes.

In the particular inventive embodiment illustrated, one end of the panel 12 is wound on a storage drum 20 rotatably mounted within a storage container 22. The panel extends from the container through an exit opening or slot 24 in the container. Along the longitudinal edges of the panel are the hollow tubular deployment booms 26 of a pair of so-called linear extenders 28. These booms are constructed of thin resiliently flexible strips which may be laterally uncurled to a flat condition and spring back to their tubular cross-section when released. The booms pass through cylindrical guides 30 in the container 22 at opposite ends of the panel exit slot 24 and are wound in flat condition on reels 32 on the ends of the drum 20. A cross member 34 is secured to the outer ends of the panel and deployment booms.

Drivably coupled to the drum 20 and reels 32 is a reversible motor 36. Operation of this motor in a direction to unwind the panel 12 and booms 26 from the drum and reels effects extension of the panel and booms to their deployed positions of FIG. 1. Thus, during this rotation of the drum and reels, the booms are unwound from the reels and extended endwise through their guides 30. As the flattened boom strips emerge from the reels and pass through the guides, the strips curl laterally into their tubular boom configurations. The extending booms, in turn, pull the panel from the storage container. Operation of the motor in the opposite direction rewinds and thereby retracts the panel and booms.

Scanner 14 is a photoelectric scanner having a housing 38 attached to the storage container 22 just below the exit slot 24. The top wall 40 of the housing is disposed in close proximity to or contacts the under surface of the panel 12. Opening through this top wall is a scanning slit 42 which defines the scanning zone 16. Mounted within the housing 38, in positions to receive light entering through the scanning slit 42, are a number of photoelectric detectors 44. These detectors are spaced along the slit and separated by light baffles 46. The side of the panel 12 opposite the scanner 14 is illuminated by a source of radiant energy, such as sunlight or artificial light.

In operation of the illustrated micrometeorite impact sensor, the panel 12 is initially deployed for exposure to the micrometeorite environment to be measured. Any micrometeorites which impact the panel sections 12a with at least the impact energy required for penetration of the sections produce puncture holes 18 in the panel. After exposure, the panel is retracted at a scanning speed across the scanning slit 42 into the storage container 22. During this scanning movement of the panel, each puncture hole 18 crossing the slit passes light through the slit to the detector or detectors 44 which scan the portion of the panel containing the hole. Each detector produces an output representing its incident light.

The detector outputs may be transmitted to a recorder 48 which produces a micrometeorite impact record 50 like that shown in FIG. 3. This record contains separate recordings of the several detector outputs. Each recording consists of a series of pulses, each representing a puncture hole 18 in the panel 12. The height of each pulse represents the size of the puncture hole and hence the size of the micrometeorite which produced the hole. The record 50 may be divided into sections 52 representing the panel sections 12a of differing thickness to permit differentiation in terms of mass and flux density of the recorded micrometeorite impacts. Thus, the pulses recorded in the various record sections 52 represent micrometeorite impacts whose energy is equal to or greater than the impact energy required to penetrate the respective panel sections 12a. Accordingly, the record 50 displays micrometeorite flux density or distribution of various energy levels. If several puncture holes 18 cross the scanning slit 42 in overlapping fashion, the impact record 50 will display a staircase polygon pattern from which the individual holes or meteorite impacts may be reconstructed. Large puncture holes in the panel may be scanned simultaneously by two detectors 44. However, this condition can be recognized from the resulting coincidence of pulses in the corresponding recordings of the impact record 50. It is evident, of course, that the detector outputs may be utilized to obtain the desired micrometeorite impact information other than by recording the outputs, as explained above.

From the foregoing description, it will be understood that the present micrometeorite impact sensor provides information concerning the size, energy, and flux distribution of micrometeorites. The impact sensor has application in a variety of space missions. Some of these missions are listed below:

a. Interplanetary space probes, asteroid belt survey, etc. In this mission the impact sensor can be used continuously, with periodic scanning for micrometeoroid punctures or it can be held in reserve for recording meteoroid shower events.

b. Planetary probe designed to penetrate Saturn's rings. In this mission the impact sensor is held in reserve and deployed only on approaching the planetary encounter. If the spacecraft survives the penetration of the planetary ring structure, an event which takes only a fraction of a second, the sensor can then be interrogated to determine the nature of the particle flux making up the planetary ring.

c. Use on earth-orbital spacecraft. A spin stabilized earth-orbital spacecraft equipped with the sensor would provide a convenient experimental platform to detect meteorite showers previously unobservable. The detector is deployed at a time when a meteorite shower is expected which can be predicted on the basis of past occurrences. It can also be commanded into action by ground observation at the initiation of shower activity.

d. Operation on lunar surface. The impact sensor can be installed on the lunar surface for relaying meteorite information back to earth.

The use of sunlight as the illumination required for operation of the present impact sensor is possible on space probes which are permanently sun-oriented with the sunline approximately normal to the sensor panel 12. Interplanetary probes using solar electric power, for example, have a principal sun-oriented axis and permit orientation of the impact sensor in the proper direction. On the other hand, for earth-orbiting probes the incidence angle of sunlight may not be suitable, in which case an artificial light source must be provided for sensor illumination.

Effective operation of the present impact sensor requires uniform illumination of the sensor panel 12 over the entire area of the scanning slit 42. In some cases, the illumination itself may be sufficiently uniform without any corrective measures. In other cases, it may be desirable or necessary to provide a diffusing optical layer between the sensor panel and the light source.

The present impact sensor is best suited for conditions where its space probe is exposed for a relatively short time to a heavy stream of micrometeorites such as would be the case in encountering a meteorite shower. Other sensors on board the spacecraft can detect the onset of such a shower and initiate the deployment of the sensor panel. After exposure to the heavy flux encounter, the panel is slowly retracted and scanned for punctures. However, the device is also applicable for measurement of more uniform meteorite flux environments. In this case the sensor panel remains deployed most of the time and is retracted periodically for scanning. The cumulative increase in the puncture count is detected during the successive scans.

Those versed in the art will now appreciate several advantages of the present micrometeorite impact sensor over the existing impact sensors. Among the foremost of these advantages are reduced weight, elimination of transducers and wiring for the sensor panel, relatively low cost, adaptability of the sensor to on board data compression to yield low data rates for playback to earth, repeated scan capability, energy and flux density differentiation capability, and reliability.

It will be understood that deployment of the sensor panel 12 may be accomplished in various ways other than that described earlier. For example, on a spin stabilized spacecraft, the panel may be deployed by centrifugal force. FIG. 4 illustrates such a spin stabilized spacecraft with four impact sensors 10a whose sensor panels 12 are deployed by centrifugal force. In this case, the deployment booms are omitted and the stowage drums are driven to unwind the sensor panels which then deploy outwardly under centrifugal force. One of the major functional advantages of the system is its ability to provide a permanent and unambigious record of micrometeorite punctures that have occurred. Thus, it permits to verify a particular event by repeatedly scanning the portion of the panel where the puncture is located, and to establish the time interval in which new punctures have occurred.

What is claimed as new in support of Letters Patent is:

1. A micrometeorite impact sensor comprising:
   a panel of sheet material to be exposed to a micrometeorite environment and having opposite ends and a thickness such that said panel is punctured by micrometeorites which impact the panel with given energy;
   a scanner having a scanning zone which extends across said panel transverse to the endwise direction of the panel and is relatively narrow compared to the panel length;
   means for effecting relative back and forth movement of said panel and scanner in a manner such that the relative movement of said panel with respect to said scanner occurs back and forth through said scanning zone from one end of the panel to the other; and
   said scanner including scanning means for sensing puncture holes in said panel passing through said scanning zone and producing an output representing said holes.

2. A micrometeorite impact sensor according to claim 1 wherein:
   said scanner is stationary and said panel is driven back and forth past said scanner.

3. A micrometeorite impact sensor according to claim 1 wherein:
   said scanner is stationary;
   said panel has normally inner and outer ends and is movable endwise past said scanner between a retracted position wherein the outer panel end is situated adjacent said scanning zone and an extended position wherein said panel is deployed outwardly from said scanner for exposure to micrometeorites;
   said sensor includes stowage means for containing said panel in its retracted position; and
   said means for effecting relative movement of said panel and scanner comprises means for extending said panel to deployed position and then retracting said panel at a given scanning speed through said scanning zone to stowed position in said stowage means.

4. A micrometeorite impact sensor according to claim 3 wherein:
   said stowage means comprises a container into which said panel is retracted in stowed position and from which said panel is extended to deployed position.

5. A micrometeorite impact sensor according to claim 1 wherein:
   different portions of said panel have different thickness which require different minimum micrometeoroid impact energies for penetration.

6. A micrometeorite impact sensor according to claim 1 wherein:
   said panel comprises a number of sections of different thickness such that said sections require different micrometeoroid impact energies for penetration.

7. A micrometeorite impact sensor comprising:
   an elongate deployable panel of sheet material
   a container;
   a rotary drum in said container fixed to one end of said panel for retraction of said panel to a stowed position within said container wherein said panel is wound on said drum and extension of said panel through an opening in said container wherein said panel is exposed for micrometeorite impact;
   said panel having a thickness such that said panel is punctured by impacting micrometeorites of given impact energy to produce puncture holes in said panel;
   a scanner on said container having a scanning slit in and transverse to the path of panel extension and retraction, whereby said panel moves across said slit with one side of the panel facing the slit during extension and retraction of the panel;
   the opposite side of said panel being adapted to be illuminated by a radiant energy source, whereby during retraction of said panel following exposure of the panel to micrometeorite impact, said scanner receives radiation from said source through said scanning slit and said puncture holes as the latter travels across said slit;
   said scanner including photoelectric sensing means for receiving the radiation entering through said scanning slit and producing an output representing the incident radiation; and
   means for effecting extension and retraction of said panel.

8. A micrometeorite impact sensor according to claim 7 wherein:

said panel comprises sections of differing thickness which require differing micrometeorite impact energies for penetration.

9. A micrometeorite impact sensor according to claim 8 wherein:
said sensing means comprise a number of photoelectric detectors spaced along said scanning slit, and baffles between the detectors.

10. The method of determining the characteristics and flux distribution of micrometeorites which comprises the steps of:
selecting a panel of sheet material of a thickness to be penetrated by impacting micrometeorites of given impact energy and a scanner for sensing holes produced in said panel by impacting micrometeorites;
exposing said panel for impact by said micrometeorites, whereby said panel is punctured by micrometeorites which impact the panel with at least said impact energy to produce puncture holes in said panel; and
scanning said panel with said scanner at intermittent intervals.
scanning said panel with said scanner at intermittent intervals.

* * * * *

UNITED STATES PATENT OFFICE
CERTIFICATE OF CORRECTION

Patent No. 3,752,996　　　　　　　　　　Dated Aug. 14, 1973

Inventor(s) Hans F. Meissinger

It is certified that error appears in the above-identified patent and that said Letters Patent are hereby corrected as shown below:

Item [73] Assignee: The United States of America as represented by the National Aeronautics & Space Administration, Washington, D.C.

Signed and sealed this 12th day of November 1974.

(SEAL)
Attest:

McCOY M. GIBSON JR.　　　　　　　　C. MARSHALL DANN
Attesting Officer　　　　　　　　　　Commissioner of Patents